UNITED STATES PATENT OFFICE.

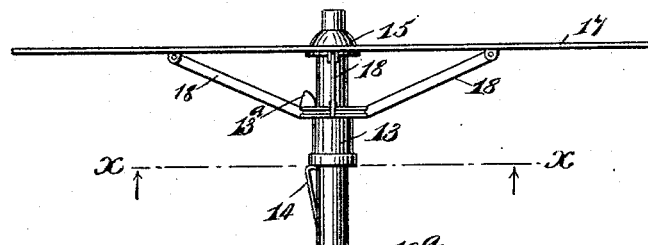
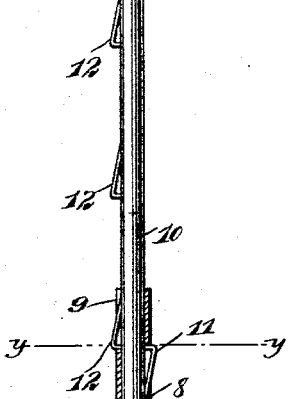
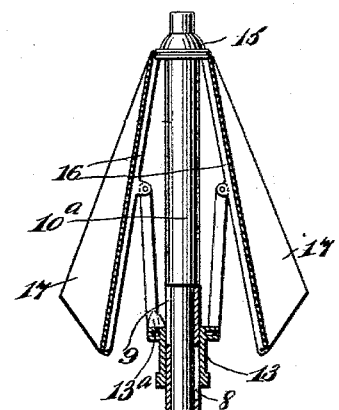
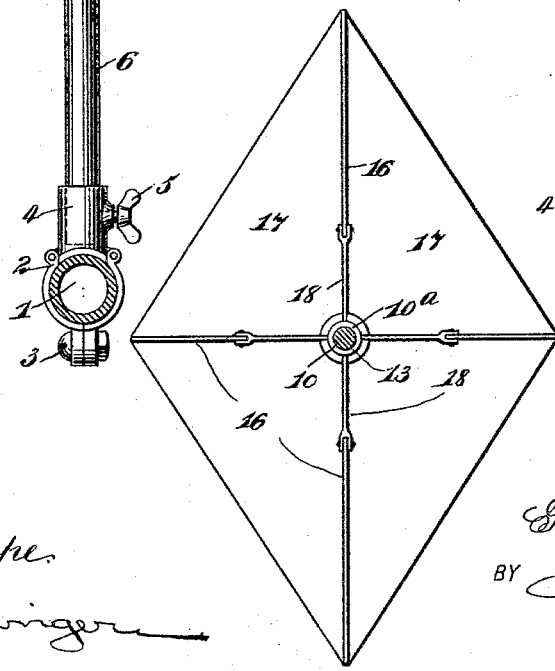

GEORGE A. CONKLIN, OF BLAIRSTOWN, IOWA.

SUNSHADE FOR BICYCLES.

SPECIFICATION forming part of Letters Patent No. 561,767, dated June 9, 1896.

Application filed August 14, 1895. Serial No. 559,266. (No model.)

*To all whom it may concern:*

Be it known that I, GEORGE A. CONKLIN, of Blairstown, in the county of Benton and State of Iowa, have invented certain new and useful Improvements in Sunshades for Bicycles and the Like, of which the following is a full, clear, and exact description.

This invention relates to certain improvements in that class of sunshades or parasols which are especially designed for use on bicycles and similar vehicles to protect the rider from the heat and light of the sun's direct rays; and the object of the invention is to provide a device of this character of a simple and inexpensive construction which shall be adapted to be folded compactly, so as to occupy as little space as possible when not in use, and which shall be at once light and strong and capable of convenient application and adjustment to secure it in place in any desired position on the bicycle or other vehicle whereto it is applied.

The invention consists in a sleeve having means for securing it in place to the frame or handle-bar of the bicycle or equivalent vehicle, a folding parasol having a stem slidable in said sleeve, and spring-retainers arranged on said stem and adapted to engage apertures in said sleeve to hold the parasol in an elevated or lowered position.

The invention also contemplates certain novel features of the construction, combination, and arrangement of the various parts of the improved parasol or sunshade, whereby certain important advantages are attained and the device is made simpler, less expensive, more durable and strong, and otherwise better adapted and more convenient for use than other similar devices heretofore employed, all as will be hereinafter fully set forth. The novel features of the invention will be carefully defined in the claims.

Reference is to be had to the accompanying drawings, forming a part of this specification, in which similar characters of reference indicate corresponding parts in all the figures.

Figure 1 is a view of the improved sunshade or parasol, showing the same in a raised and opened position, the upper part of the sleeve of the device being shown in section. Fig. 2 is a similar view showing the parasol or sunshade in its folded and lowered position, the parasol or sunshade proper and the upper part of the supporting-sleeve being shown in section. Fig. 3 is an inverted plan view, on the line $x$ $x$ in Fig. 1, of the parasol or sunshade proper, showing the construction of the frame thereof; and Fig. 4 is a sectional view, on the line $y$ $y$ of Fig. 1, showing a modified form of the sleeve for supporting the device in place.

Referring first to Figs. 1, 2, and 3, 1 represents one of the frame-bars or the handle-bar of a bicycle or other equivalent part whereto the device is attached, and 2 represents a socket-piece adapted for attachment thereto, being provided with hinged clamping-arms, having a clamp-screw 3, whereby it may be clamped fast, as will be readily understood, and said socket-piece 2 is provided at its upper part with a socket 4, having a set-screw 5, whereby the supporting-sleeve 6 of the device, the lower end of which is arranged to be inserted in said socket 4, may be set fast when in place. Said supporting-sleeve 6 is, as clearly shown in the drawings, constructed of a piece of ordinary tubing, which may be finished or enameled in any way desired, as may the various other parts of the device, and adjacent to its upper end, which is open, said sleeve 6 is provided at opposite sides with vertical apertures or slots 8 and 9, the slot 9 being above the slot 8 and having its upper end open and extending to the upper end of said sleeve.

The sleeve 6 is adapted to receive within its hollow a stem 10, provided with spring-retainers 11 and 12, which may be of any preferred construction, being, as herein shown, similar to the retainers commonly employed in umbrellas and parasols, and said retainers 11 and 12 are arranged at opposite sides of stem 10, being adapted, respectively, to engage the slots or apertures 8 and 9 in the supporting-sleeve 6. The spring-retainers 11 and 12 are set oppositely, the retainer 11 being arranged, when engaged with its aperture 8, to hold the stem 10 against removal from sleeve 6, but permitting it to be pushed down in said sleeve, while the series of retainers 12 are arranged to hold the stem against being pushed down in said sleeve.

The stem 10 carries at its upper end the parasol or sunshade proper, and its frame consists of a runner 13, slidable on said stem and having its under side arranged to be engaged by a retainer 14 on said stem, a nut 15 on the upper end of the stem, ribs 16, hinged to said nut and carrying the canopy 17, and braces 18, hinged at their outer ends to said ribs and at their inner ends to the runner 13.

As herein shown, the canopy 17 is cut to a diamond shape, being bound around its edge with cord of suitable strength, and is provided with four ribs 16, two of which are of greater length than the others, as seen in Fig. 3, and are arranged opposite each other. The stem 10 is enlarged at its upper end, as seen at 10ª, such enlarged portion being of a diameter substantially equal to that of the inside of the runner 13, which slides thereon, and when said stem is in its lowermost position, as seen in Fig. 2, the lower end of said enlarged portion 10ª is adapted to engage the upper side of the sleeve 6, so that the runner 13 may be slid down over said sleeve to close or fold the canopy 17.

On the top of the runner 13 is arranged a cam-block 13ª, having an inclined inner side adapted to engage the retainers 12 when the runner is pushed up, so as to push said retainers out of position to engage said runner when it is desired to raise the sunshade.

From the above description it will be seen that the device is capable of being readily adjusted both vertically and laterally, so as to be placed in the best position to shade and protect the rider from the light and heat, and when not required for use may be folded compactly, so as to occupy but little space and be out of the way. Furthermore, the device is extremely simple and inexpensive in its construction and operation, is of but little weight, and comprises comparatively few parts.

If desired, the sleeve 6 may be constructed as shown in the detail view 4, wherein it is shown as provided with two oppositely-arranged longitudinal grooves 7, formed on its interior, extending above and below the apertures 8 and 9 and adapted to be traversed by the retainers 11 and 12 as the stem 10 is slid up and down. By this construction said retainers act at all times to hold the stem against turning in the sleeve 6.

From the above description of my improved parasol or sunshade it will be apparent that the device is susceptible of considerable modification without material departure from the principles and spirit of my invention, and for this reason I do not wish to be understood as limiting myself to the precise form of the device herein set forth. For example, the device may be made of a square form and employed on various forms of vehicles, such as express and delivery wagons, and when desired for use on ladies' bicycles the clamping-arms of the socket-piece 2 may be arranged to project from one end of said socket, so as to be adapted to be clamped to the steering-head just below the handle-bar.

Having thus described my invention, I claim as new and desire to secure by Letters Patent—

1. A sunshade comprising a sleeve means for securing said sleeve to a bicycle or the like, a stem arranged to slide in said sleeve, a folding frame mounted on said stem and comprising pivoted ribs carrying a canopy, braces pivoted to the ribs, a runner sliding on the stem and pivoted to said braces, means for holding the frame in an unfolded position, and means for securing said stem adjustably to the sleeve, said runner being adapted, when the frame is folded, to slip down over said sleeve, substantially as set forth.

2. A sunshade comprising a sleeve, means for securing the sleeve to a suitable support, a stem arranged to slide in the said sleeve and having an enlarged upper portion, a folding frame mounted on said stem and comprising pivoted ribs carrying a canopy, braces pivoted to the ribs, a runner pivoted to said braces and arranged to slide on said enlarged upper portion of the stem, means for holding the frame in an unfolded position, and means for securing said stem adjustably to the sleeve, the enlarged portion of the stem being of substantially equal diameter to the said sleeve, and being adapted to abut against the upper end of said sleeve when the sleeve is in its lowermost position, said runner being adapted, when the frame is folded, to slip down on said sleeve, substantially as set forth.

3. A sunshade, comprising a sleeve provided at opposite sides with vertical slots, one of said slots being above the other and having its upper end opening at the upper end of the sleeve, a stem carrying a folding canopy and arranged to slide in said sleeve, and two retainers on said stem to engage the respective slots in the sleeve, one of said retainers being arranged to hold the stem against removal from the sleeve and the other being arranged to hold said stem against being slid into said sleeve, substantially as set forth.

4. A sunshade, comprising a sleeve having two slots formed therein at opposite sides, the said sleeve being provided with oppositely-arranged longitudinal grooves formed on its interior, a stem carrying a folding canopy and arranged to slide in the said sleeve, and retainers on said stem adapted to engage the said slots, the said retainers being adapted to traverse the said longitudinal grooves as the stem is slid up and down, substantially as set forth.

5. A sunshade, comprising a sleeve, a stem arranged to slide therein, a frame mounted on said stem and comprising pivoted ribs carrying a canopy, braces pivoted to the ribs, a runner sliding on the stem and pivoted to said braces, retainers on said stem adapted to engage the runner, and means carried by said runner at the top thereof and adapted to engage the said retainers when the runner is pushed up, and move said retainers out of engaging position, substantially as set forth.

6. A sunshade, comprising a sleeve, a stem arranged to slide therein, a folding frame mounted on said stem and comprising pivoted ribs carrying a canopy, braces pivoted to the ribs, a runner pivoted to said braces and arranged to slide on said stem, retainers on said stem adapted to engage the runner, and a cam-block carried by the runner and having an inclined inner face adapted to engage the said retainers, as and for the purpose set forth.

GEORGE A. CONKLIN.

Witnesses:
C. R. GOSS,
GEO. WAGNER.